(12) United States Patent
Wigmore et al.

(10) Patent No.: US 10,108,644 B1
(45) Date of Patent: Oct. 23, 2018

(54) METHOD FOR MINIMIZING STORAGE REQUIREMENTS ON FAST/EXPENSIVE ARRAYS FOR DATA MOBILITY AND MIGRATION

(71) Applicant: EMC Corporation, Hopkinton, MA (US)

(72) Inventors: Ian Wigmore, Westborough, MA (US); Marik Marshak, Newton, MA (US); Arieh Don, Newton, MA (US); Alexandr Veprinsky, Brookline, MA (US); Gabriel BenHanokh, Tel-Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 303 days.

(21) Appl. No.: 14/206,378

(22) Filed: Mar. 12, 2014

(51) Int. Cl.
*G06F 17/30* (2006.01)

(52) U.S. Cl.
CPC .................. *G06F 17/303* (2013.01)

(58) Field of Classification Search
CPC ............... G06F 3/0641; G06F 11/1453; G06F 17/30156; G06F 3/067; G06F 17/30159; G06F 3/0653; G06F 3/0665; G06F 3/0685; G06F 11/1435
See application file for complete search history.

(56) References Cited

U.S. PATENT DOCUMENTS

| 8,930,612 B2 * | 1/2015 | Goss | G06F 3/0641 |
| | | | 711/103 |
| 2008/0104349 A1 * | 5/2008 | Maruyama | G06F 3/0613 |
| | | | 711/165 |
| 2009/0234795 A1 * | 9/2009 | Haas | G06F 17/30489 |
| | | | 707/999.001 |
| 2011/0191305 A1 * | 8/2011 | Nakamura | G06F 3/0608 |
| | | | 707/692 |
| 2012/0084445 A1 * | 4/2012 | Brock | G06F 9/5077 |
| | | | 709/226 |
| 2012/0144149 A1 * | 6/2012 | Aronovich | G06F 11/3485 |
| | | | 711/171 |
| 2012/0191670 A1 * | 7/2012 | Kennedy | G06F 11/1453 |
| | | | 707/692 |
| 2012/0278569 A1 * | 11/2012 | Kawakami | G06F 3/0608 |
| | | | 711/162 |
| 2013/0275394 A1 * | 10/2013 | Watanabe | G06F 17/30303 |
| | | | 707/692 |

* cited by examiner

*Primary Examiner* — Carol Choi
(74) *Attorney, Agent, or Firm* — Womble Bond Dickinson (US) LLP

(57) ABSTRACT

Exemplary methods for data migration from a first storage system to a second storage system include maintaining a database containing deduplication information associated with a plurality of remote target storage systems. In one embodiment, the methods include identifying a plurality of storage devices of the first storage system as candidates to be migrated to the second storage system based on access patterns of the storage devices at the first storage system, and selecting one or more storage devices from the identified candidates to be migrated to a second one of the plurality of remote target storage systems that is selected based on the deduplication information of the database. In one embodiment, the methods further include migrating one or more datasets stored at the selected one or more storage devices to the second storage system.

18 Claims, 6 Drawing Sheets

METHOD FOR MINIMIZING STORAGE REQUIREMENTS ON FAST/EXPENSIVE ARRAYS FOR DATA MOBILITY AND MIGRATION

FIELD

Embodiments of the invention relate to data storage systems; and more specifically, to minimizing storage requirements during data migration.

BACKGROUND

Data storage utilization is continually increasing, causing the proliferation of storage systems in data centers. In particular, the size of the applications and the data generated therefrom is increasing. Data centers typically comprise of different tiers of storage systems. Some storage systems are high performance, and thus, are more expensive. As used herein, high performing storage systems refer to those that can provide fast access to data. In order to minimize cost, data centers typically also include some low performance storage systems because they cost less per storage quantity (e.g., gigabyte). As used herein, low performing storage systems refer to those that require more time to access data, as compared to high performing storage systems.

Not all data are the same. Some data, for example, are more relevant than others. As used herein, relevant data refers to data that are frequently accessed. Typically, relevant data are stored in high performing storage systems, and less relevant data are stored in low performing storage systems. In some instances, it is necessary to migrate data from a low performing storage system to a high performing storage system. For example, the relevance of data may change over time (e.g., data which was formerly less relevant may become more relevant over time). A conventional storage system determines which data to migrate based purely on data relevance, without any regards to storage utilization efficiency. Thus, providing fast access to data can be quite costly.

FIG. 1 is a block diagram illustrating a conventional storage system. System 100 includes slow storage array 101 and fast storage array 102. Slow storage array 101 includes storage devices 110, 111, and all other storage devices 112. Fast storage array 102 includes storage device 120. As illustrated, storage device 110 contains data "A, B, C", storage device 111 contains data "D, E, F", all other storage devices 112 contain data "G, H, I". Storage device 120 contains data "A, B, C, X, Y, Z". In this example, storage device 110 has a 40% input/output (I/O) usage profile, storage device 111 has a 55% I/O usage profile, and all other storage devices 112 have a 5% I/O usage profile. As used herein, "I/O usage profile" refers to information indicating how frequently the storage device I/O has been utilized (e.g., how frequently the data contained in the storage device has been accessed). In a conventional storage system, the selection of data to be migrated is based solely on I/O usage profiles. Thus, migratory 103 selects the storage device with the highest I/O usage profile (in this example, storage device 111) and migrates the data stored therein to fast storage array 102.

After data migration is completed, fast storage array 102 experiences a 50% increase in storage usage due to the additional data "D, E, F". Note that storage device 110 contains data which are already present in fast storage array 102. Thus, if data from storage device 110 was selected for migration, fast storage array 102 would experience 0% increase in storage usage after migration due to data deduplication.

BRIEF DESCRIPTION OF THE DRAWINGS

Embodiments of the invention are illustrated by way of example and not limitation in the figures of the accompanying drawings in which like references indicate similar elements.

DESCRIPTION OF EMBODIMENTS

Figure 1:
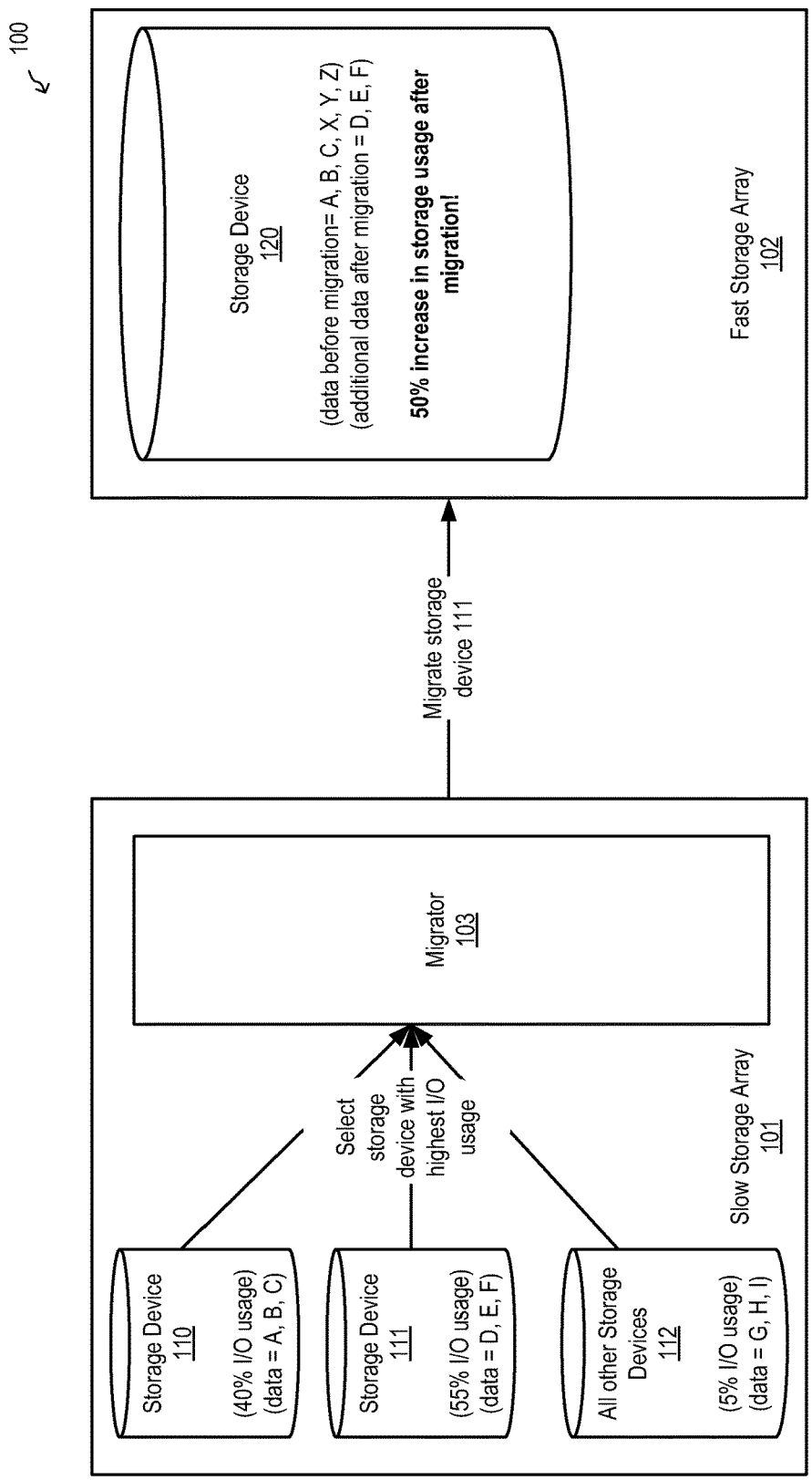
FIG. 1 is a block diagram illustrating a conventional storage system.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device or a computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

Exemplary methods for minimizing storage utilization during a migration of data from a first storage system to a second storage system are described herein. According to one embodiment, a migration engine located at the first storage system selects a first dataset stored locally to be migrated to the second storage system. As used herein, a dataset refers to a collection of files, directories, drives, etc., or any combination thereof. Deduplication information of the first dataset is generated and stored as part of a deduplication database. The selected first dataset is then migrated to the second storage system. The deduplication information stored in the deduplication database is used, according to one embodiment, for predicting data that are stored at the second storage system. The ability to predict what data are stored at the second storage system enables the migration engine to intelligently estimate how much physical storage will be incurred at the second storage system by any given dataset stored at the first storage system. Thus, the deduplication database allows the migration engine to select datasets to be migrated based in part on storage utilization efficiency.

In one aspect of the invention, the migration engine identifies a set of one or more storage units as candidates to be migrated to the second storage system. In such an embodiment, the candidates are identified based on relevance of data stored therein. In one embodiment, relevance of data is determined based on, although not limited to, the I/O usage profile of each storage unit. According to one embodiment, the migration engine determines the deduplication ratio of each candidate using deduplication information stored in the deduplication database. A deduplication ratio is derived by dividing the used logical space by the used physical space. Thus, a high deduplication ratio indicates that the dataset is efficiently stored in the storage unit because it requires less physical space as compared to a dataset with a low deduplication ratio.

In one embodiment, the migration engine selects from the candidates one or more storage units with the highest deduplication ratio to be migrated to the second storage system. In one embodiment, one or more datasets from the selected storage units with the highest deduplication ratios are migrated to the second storage system. In one embodiment, as datasets are migrated from the first to the second storage system, the migration engine updates the deduplication database to include deduplication information of the migrated data. By continually updating the deduplication database, the migration engine is able to accurately predict data stored at the second storage system, and thus, accurately predict storage utilization after deduplication.

Figure 2:
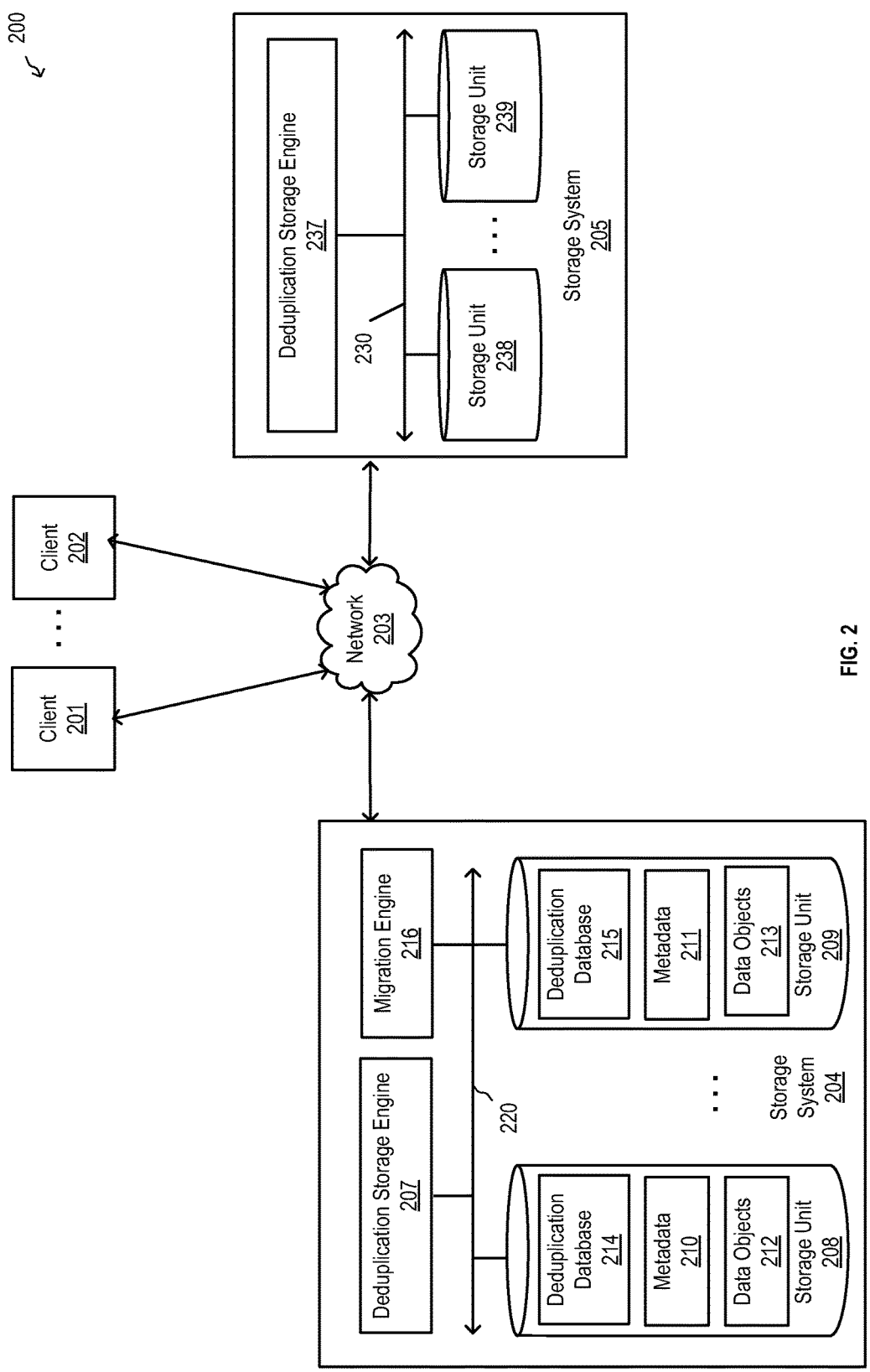
FIG. 2 is a block diagram illustrating a storage system according to one embodiment.

FIG. 2 is a block diagram illustrating a storage system according to one embodiment of the invention. Referring to FIG. 2, system 200 includes, but is not limited to, one or more client systems 201-202 communicatively coupled to storage system 204 and storage system 205 over network 203. Clients 201-202 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 203 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 205 includes deduplication storage engine 237 communicatively coupled to storage units 238-239 via interconnect 230, which may be a bus and/or a network. In one embodiment, deduplication storage engine 237 is configured to perform operations similar to those performed by deduplication storage engine 207 (described in further details below), and storage units 238-239 are configured to store data similar to those stored in storage units 208-209 (described in further details below).

Storage system 204 may include any type of server or cluster of servers. For example, storage system 204 may be a storage server used for any of various different purposes, such as to provide multiple users with access to shared data and/or to back up mission critical data. Storage system 204 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 204 may have a distributed architecture, or all of its components may be integrated into a single unit. Storage system 204 may be implemented as part of an archive and/or backup system such as a deduplicating storage system available from EMC® Corporation of Hopkinton, Mass.

In one embodiment, storage system 204 includes, but is not limited to, migration engine 216, deduplication storage engine 207, and one or more storage units 208-209 communicatively coupled to each other. Storage units 208-209 may be implemented locally (e.g., single node operating environment) or remotely (e.g., multi-node operating environment) via interconnect 220, which may be a bus and/or a network. In one embodiment, one of the storage units 208-209 operates as an active storage to receive and store external or fresh user data, while the other storage unit operates as a target storage unit to periodically archive data from the active storage unit according to an archiving policy or scheme. Storage units 208-209 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 208-209 may also be a combination of such devices. In the case of disk storage media, the storage units 208-209 may be organized into one or more volumes of Redundant Array of Inexpensive Disks (RAID).

In response to data (e.g., a data file) to be stored in storage units 208-209, deduplication storage engine 207 is configured to segment the data into multiple chunks according to a variety of segmentation policies or rules. Deduplication storage engine 207 may choose not to store a chunk in a storage unit if the chunk has been previously stored in the storage unit. In the event that deduplication storage engine 207 chooses not to store the chunk in the storage unit, it stores metadata enabling the reconstruction of the data using the previously stored chunk. As a result, chunks of the data are stored in a deduplicated manner, either within each of storage units 208-209 or across at least some of storage units 208-209. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 210-211, may be stored in at least some of storage units 208-209, such that data can be accessed independent of another storage unit. Metadata of each storage unit includes enough information to provide access to the data it contains. In one embodiment, metadata may include fingerprints contained within data objects 212-213, where a data object may represent a data chunk, a compression region (CR) of data chunks, or a container of one or more CRs. Fingerprints are mapped to a particular data object via metadata 210-211, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any data not stored in the failed storage unit. When data is deleted, the metadata associated with the data in the system is updated to reflect that the data has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 2 may be used as a tier of storage in a storage hierarchy that comprises other tiers of storage. One or more tiers of storage in this hierarchy may utilize different kinds of storage devices and/or may be optimized for different characteristics such as random update performance. Data are periodically moved among the tiers based on data management policies to achieve a cost-effective match to the current storage requirements of the data. For example, data may initially be stored in a tier of storage that offers high performance for reads and writes. As the data ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

In one embodiment, storage system 204 includes one or more network interfaces (not shown) for communicating with other networked devices (e.g., clients 201-202). A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

According to one aspect of the invention, migration engine 216 is configured to migrate at least a portion of data stored in storage units 208-209 to storage system 205. As part of the migration process, migration engine 216 is configured to select an initial dataset to be migrated to storage system 205. In one embodiment, the initial dataset to be migrated is selected based on relevance. For example, the most frequently accessed dataset is selected for migration to storage system 205. Prior to migrating the selected initial dataset, migration engine 206 causes deduplication storage engine 207 to generate deduplication information of each data chunk corresponding to the dataset. In one embodiment, deduplication information includes a fingerprint of a data chunk. In such an embodiment, a fingerprint may include a hash value computed based on the data chunk using a variety of hash algorithms, such as SHA-1 or MD5 hash algorithms. Throughout the description, fingerprint is utilized as an example of deduplication information. It shall be appreciated, however, that other types of data can be used.

Throughout the description, generation of deduplication information is described as part of the migration process. Here, generation of the deduplication information can be performed in response to a determination to perform migration. It shall be appreciated, however, that in some embodiments, the deduplication information may have been previously generated when data was initially stored as part of storage units 208-209.

In one embodiment, the generated deduplication information are stored as part of deduplication databases 214-215. In such an embodiment, deduplication databases 214-215 can be utilized to predict data that is stored at storage system 205. According to one embodiment, once deduplication databases 214-215 have been generated, migration engine 216 is able to determine other datasets to migrate to storage system 205 based not only on relevance, but further based on storage utilization efficiency. For example, migration engine 216 can select a set of most relevant datasets, and determine the deduplication ratio of each of the selected relevant datasets using the deduplication information stored in deduplication databases 214-215. In one embodiment, migration engine 216 then selects the candidates with the highest deduplication ratios for migration. Migrating datasets with the highest deduplication ratios results in the least amount of increase in storage utilization at storage system 205. Various embodiments of the present invention shall become apparent through the discussion of other figures below, in which like references indicate similar elements.

Figure 3:
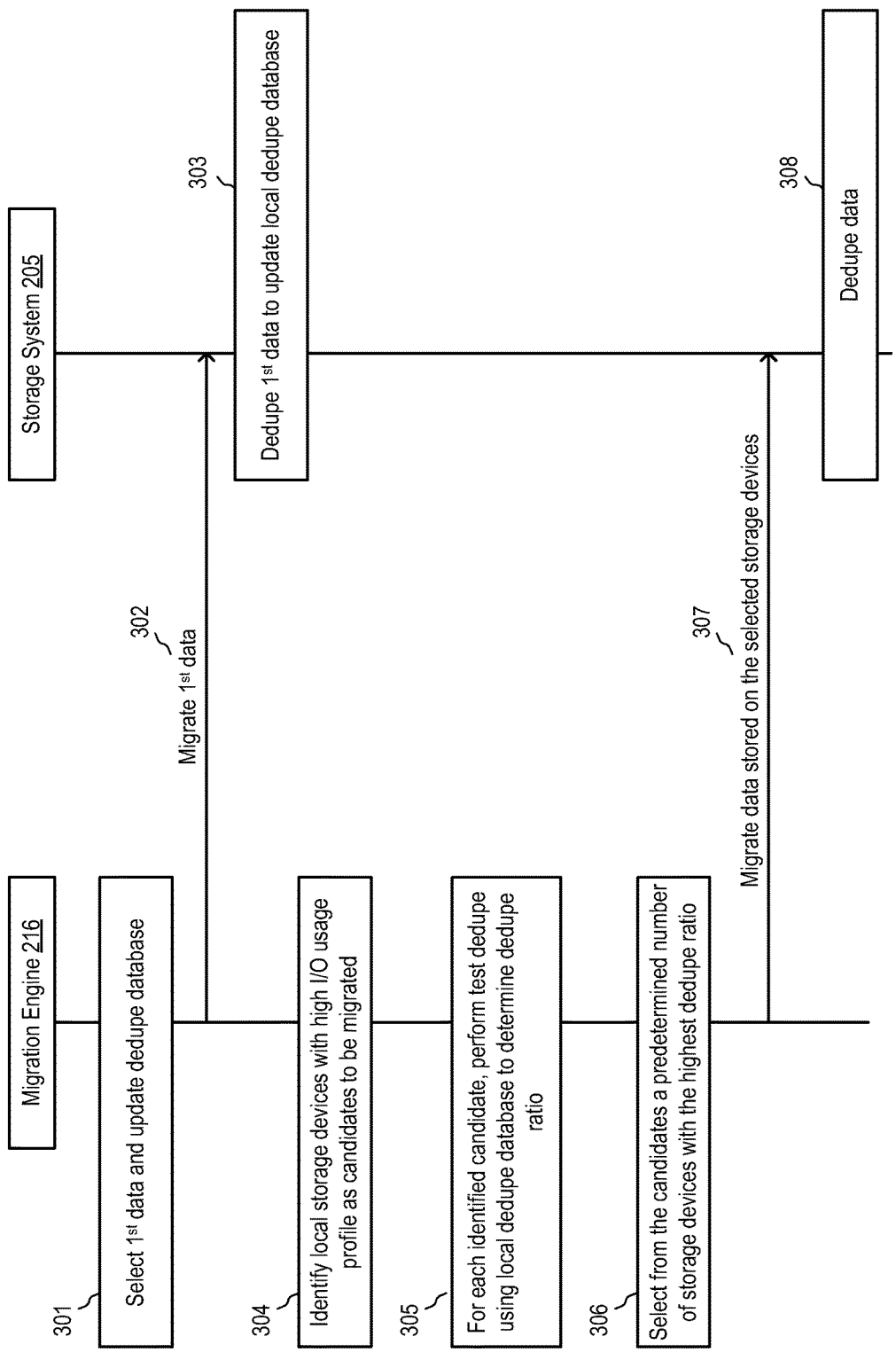
FIG. 3 is a flow diagram illustrating the transactions for migrating data according to one embodiment.

FIG. 3 is a flow diagram illustrating the transactions for migrating data according to one embodiment. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

Figure 4:
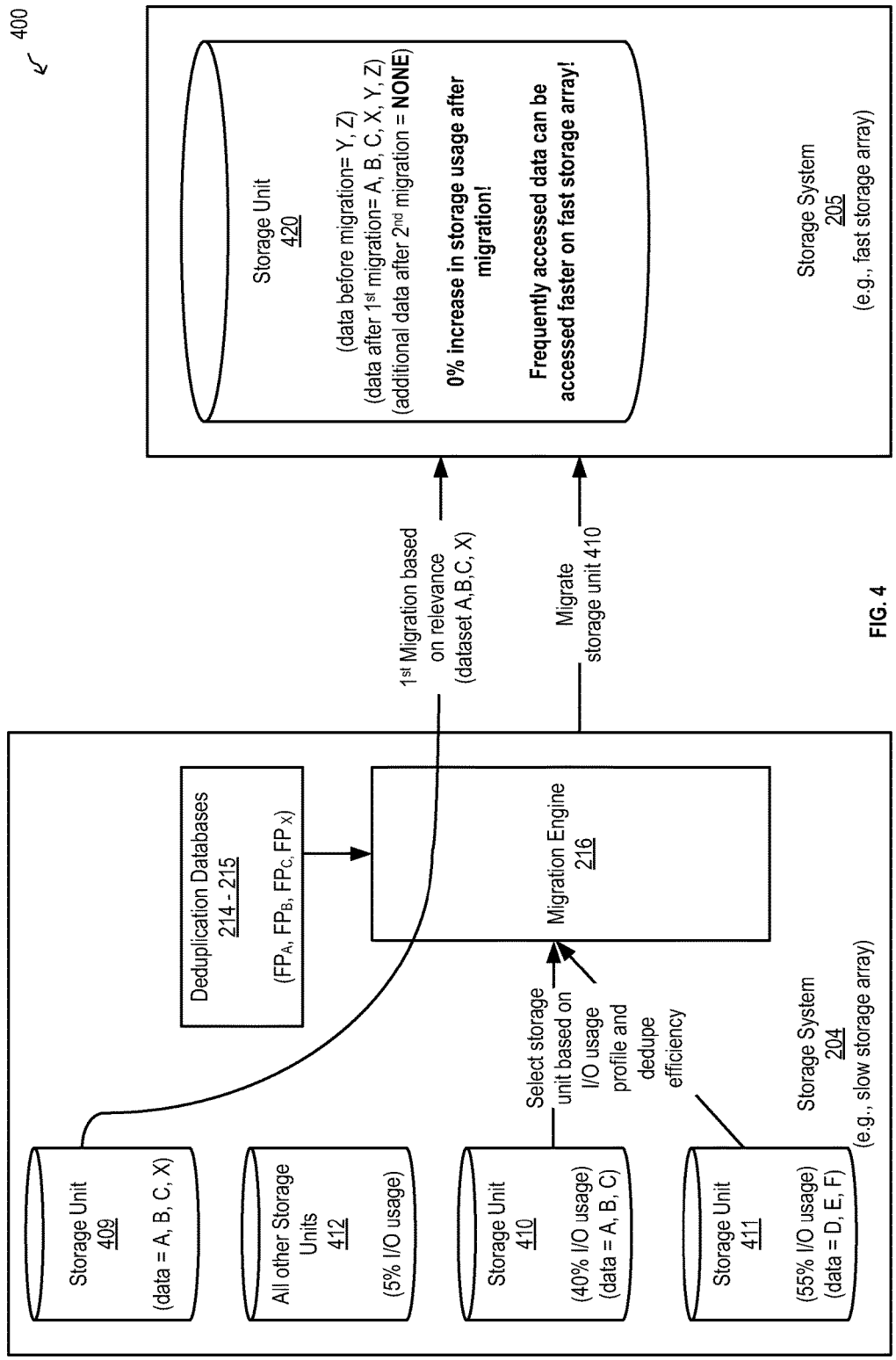
FIG. 4 is a block diagram illustrating a storage system according to one embodiment.

FIG. 3 shall be described with reference to the example illustrated in FIG. 4. System 400 of FIG. 4 is similar to system 200 of FIG. 2, except that certain details have been omitted in order to avoid obscuring the invention. In the example illustrated in FIG. 4, storage system 204 includes storage units 409, 410, 411, and all other storage units 412. Storage system 205 includes storage unit 420. In this example, it is assumed that storage unit 409 contains dataset "A, B, C, X", storage unit 410 contains the dataset "A, B, C", and storage unit 411 contains the dataset "D, E, F". Further, storage unit 420 initially contains the dataset "Y, Z". It is further assumed that storage unit 410 has a 40% I/O usage profile, storage unit 411 has a 55% I/O usage profile, and all other storage units 412 has a 5% I/O usage profile.

Referring now to FIG. 3, at transaction 301, migration engine 216 selects a first dataset to be migrated to storage system 205. According to one embodiment, for the purpose of illustration, at this point deduplication databases 214-215 do not contain any deduplication information. Thus, the first dataset is selected based on relevance. In this example, migration engine 216 selects the first dataset containing data chunks "A, B, C, X" currently stored as part of storage unit 409. As part of transaction 301, migration engine 216 populates/updates deduplication databases 214-215 with deduplication information of the first dataset. In one embodiment, the deduplication information includes a fingerprint for each data chunk (shown as $FP_A$, $FP_B$, $FP_C$, and $FP_X$, respectively).

In one embodiment, migration engine 216 causes deduplication storage engine 207 to generate the deduplication information in response to selecting the first dataset. In some embodiments, some or all of the deduplication information of the first dataset have been previously generated when the dataset was initially stored at storage system 204. At transaction 302, migration engine 216 migrates the first dataset to storage system 205. At transaction 303, storage system 205 deduplicates the first dataset and updates its local deduplication database to include deduplication information of the first dataset.

A conventional storage system migrates data based solely on relevance. Thus, in this example, a conventional storage system (without the benefits of deduplication databases 214-215 and migration engine 216 of the present invention) would migrate data from storage unit 411 to storage system 205 because storage unit 411 has the highest I/O usage profile. Such a migration, however, would drastically increase storage utilization at storage system 205 (in this example, more than double). An embodiment of the present invention overcomes these limitations by performing data migration based on relevance and further based on deduplication efficiency.

At transaction 304, migration engine 216 identifies local storage units that contain relevant data. According to one embodiment, relevant data is identified based on the I/O usage profile of the storage unit. For example, an I/O usage profile may contain information such as the number of I/O accesses that have been performed on a storage unit over a predetermined time interval (e.g., the number I/O accesses per second). Such access patterns can be utilized to infer the relevance of data stored therein. Relevant data can be identified, however, utilizing other mechanisms. In this example, migration engine 216 selects storage units 410 and 411 as candidates for migration because they contain the most relevant data (e.g., because they have the highest I/O usage profiles, e.g., the most number of I/O accesses per second).

At transaction 305, migration engine 216 determines a deduplication ratio for one or more datasets contained in the selected candidate storage units. For example, once a set of candidate storage units have been selected, migration engine 216 causes deduplication storage engine 207 to perform a test deduplication for one or more datasets contained in each of the selected candidate storage units. The test deduplication is performed using deduplication information stored in deduplication databases 214-215. As a result of the test deduplication, a deduplication ratio is generated for each dataset. As set forth above, a dataset with a high deduplication ratio requires less storage space than a dataset with a low deduplication ratio.

At transaction 306, migration engine 216 selects from the candidates a predetermined number of storage units with the highest deduplication ratio. In the illustrated example, the dataset "A, B, C" contained in storage unit 410 has a higher deduplication ratio than the dataset "D, E, F" contained in storage unit 411, because deduplication databases 214-215 predict (e.g., using fingerprints $FP_A$, $FP_B$, $FP_C$) that data chunks "A, B, C" already exist at storage system 205. Thus, by using deduplication information stored in deduplication databases 214-215, migration engine 216 can predict that migrating dataset "A, B, C" from storage unit 410 to storage system 205 would not incur any (or incur less) additional storage utilization at storage system 205 after the data chunks have been deduplicated by storage system 205.

At transaction 307, migration engine 216 migrates one or more datasets stored on the selected storage units with the highest deduplication ratio (or a deduplication ratio greater than a predetermined threshold) to storage system 205. In this example, migration engine 216 migrates the dataset containing "A, B, C" stored at storage unit 410 to storage system 205. At transaction 308, storage system 205 performs deduplication on the received dataset. In this example, no additional storage space is required to store data chunks "A, B, C" after they have been deduplicated. It shall be understood, however, that some storage overhead may be required to store metadata relating to data chunks "A, B, C". Thus, by performing migration based on relevance and deduplication efficiency, an embodiment of the present invention allows relevant data to be accessed more quickly on a high performing storage system, while at the same time minimizing cost by ensuring minimum additional storage space is utilized.

Although not shown, it shall be understood that as each dataset is migrated, migration engine 216 updates deduplication databases 214-215 in order to accurately predict data stored at storage system 205 during subsequent data migration. Embodiments of the migration mechanisms of the present invention have been described with respect to a single target/destination storage system. The present migration mechanisms, however, are not so limited, and equally apply to multiple target/destination storage systems. For example, there may be multiple destination storage systems that are qualified for receiving migrated data based on the predicted deduplication rates (e.g., greater than a predetermined deduplication rate). Migration engine 216 may select one of them as the final migration destination based on other factors as well, such as, for example, network bandwidth requirement, available processing resources (e.g., central processing unit (CPU) power) of the remote storage system candidates, and geographical locations of the storage systems, etc. Such information can be collected from the storage systems by a management entity or server (not shown) and can be obtained by migration engine 216 of storage system 204 via an application programming interface (API) from the management server or alternatively, source storage system 204 can directly communicate with the target storage systems for the same information.

Figure 5:
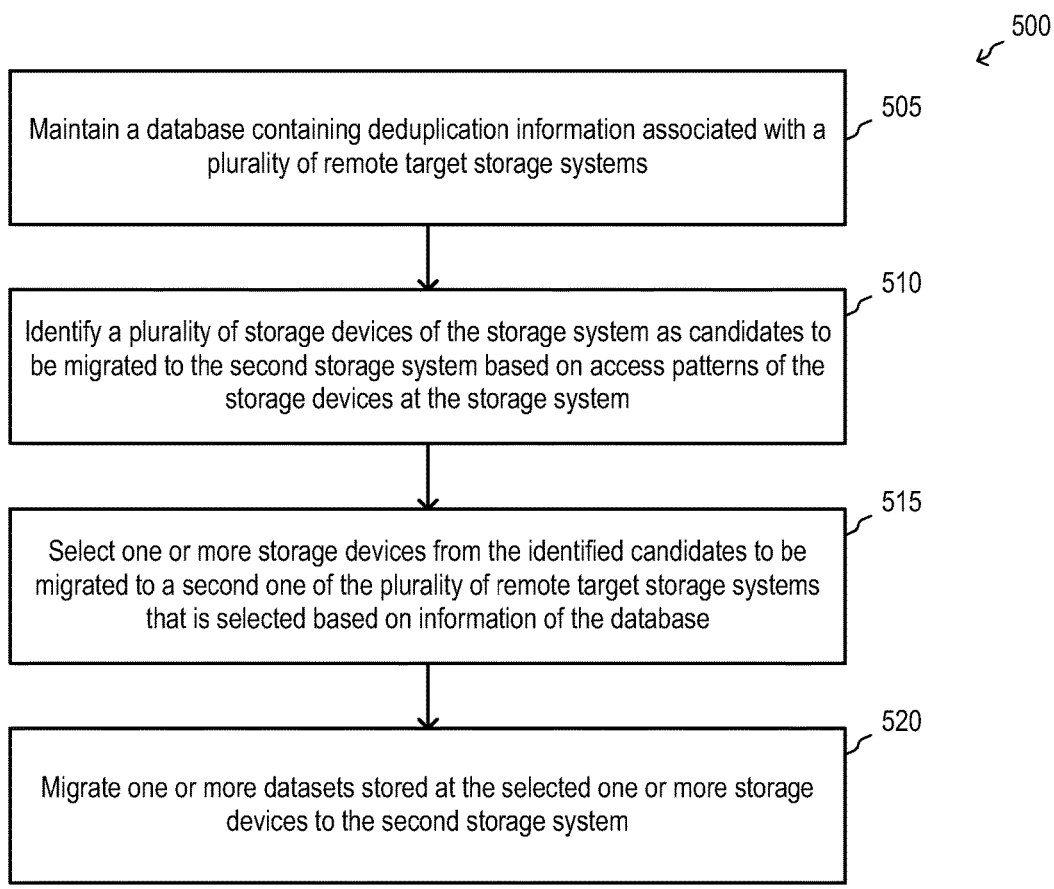
FIG. 5 is a flow diagram illustrating the transactions for migrating data according to one embodiment.

FIG. 5 is a flow diagram illustrating method 500 for performing data migration from a first storage system to a second storage system, according to one embodiment. For example, method 500 can be performed by the first storage system, such as storage system 204 (e.g., migration engine 216 of storage system 204), which can be implemented in software, firmware, hardware, or any combination thereof. Referring now to method 500, at block 505, the migration engine maintains a database (e.g., deduplication databases 214-215) containing deduplication information associated with a plurality of remote target storage systems (e.g., storage system 205). For example, the operations of block 505 can be performed as part of transaction 301.

At block 510, the migration engine identifies a plurality of storage devices (e.g., storage units 410-411) of the first storage system as candidates to be migrated to the second storage system based on access patterns (e.g., frequency) of the storage devices at the first storage system. For example, the operations of block 510 can be performed as part of transaction 304.

At block 515, the migration engine selects one or more storage devices from the identified candidates to be migrated to a second one of the plurality of remote second storage systems that is selected based on the deduplication information of the database. For example, the operations of block 515 can be performed as part of transaction 306. At block 520, the migration engine migrates one or more datasets stored at the selected one or more storage devices to the second storage system (e.g., as part of transaction 307).

Figure 6:
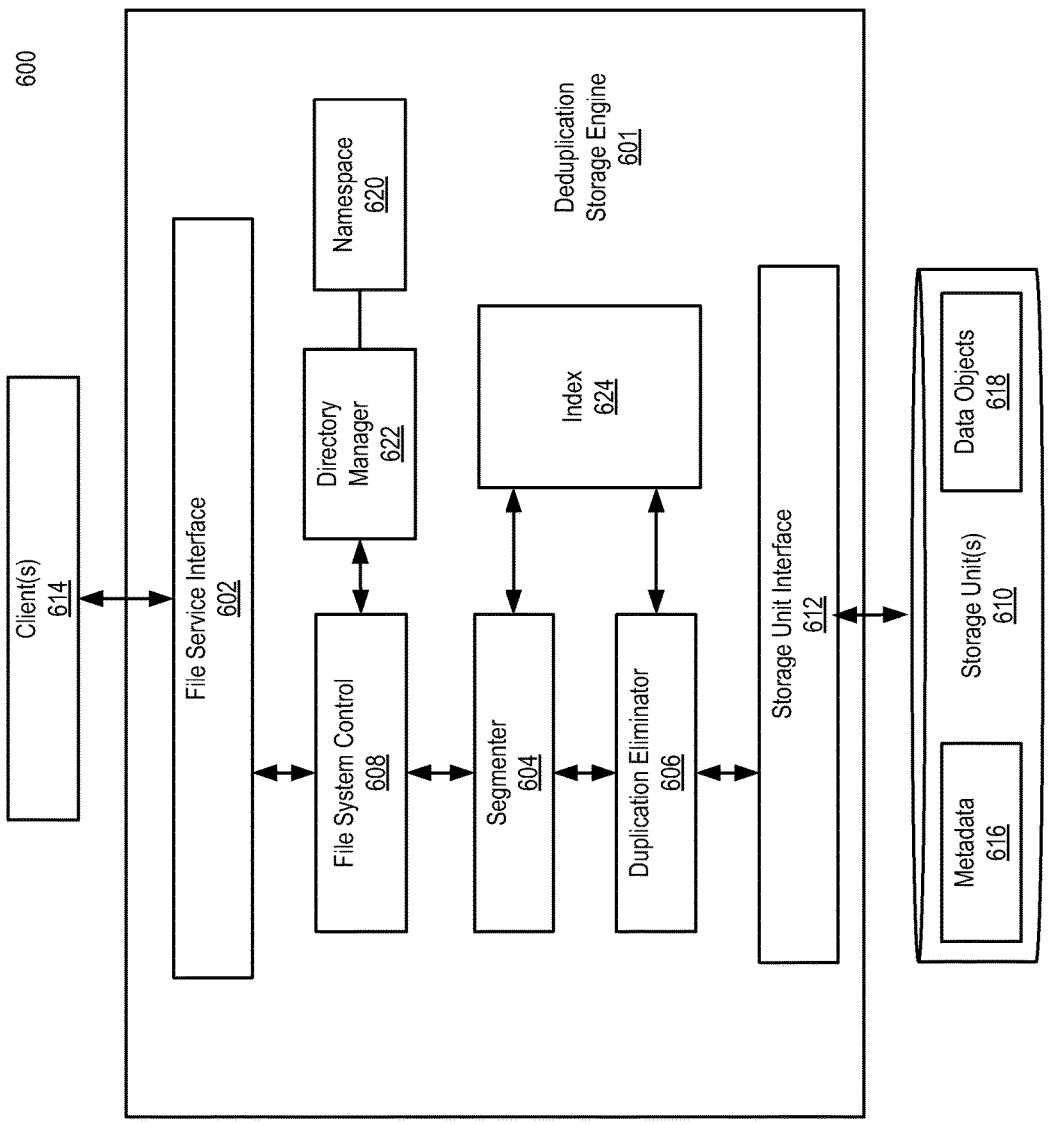
FIG. 6 is a block diagram illustrating a deduplication storage engine which can be used with embodiments of the invention.

FIG. 6 is a block diagram illustrating a deduplication storage system according to one embodiment of the invention. For example, deduplication storage system 600 may be implemented as part of a deduplication storage system as described above, such as, for example, the deduplication storage system as shown in FIG. 1. In one embodiment, storage system 600 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 600 may have a distributed architecture, or all of its components may be integrated into a single unit. Storage system 600 may be implemented as part of an archive and/or backup system such as a deduplicating storage system available from EMC® Corporation of Hopkinton, Mass.

In one embodiment, storage system 600 includes a deduplication engine 601 interfacing one or more clients 614 with one or more storage units 610 storing metadata 616 and data objects 618. Clients 614 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 610 may be implemented locally (e.g., single node operating environment) or remotely (e.g., multi-node operating environment) via an interconnect, which may be a bus and/or a network. In one embodiment, one of storage units 610 operates as an active storage to receive and store external or fresh user data, while the another one of storage units 610 operates as a target storage unit to periodically archive data from the active storage unit according to an archiving policy or scheme. Storage units 610 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 610 may also be combinations of such devices. In the case of disk storage media, the storage units 610 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 616, may be stored in at least some of storage units 610, such that files can be accessed independent of another storage unit. Metadata of each storage unit includes enough information to provide access to the files it contains. In one embodiment, metadata may include fingerprints contained within data objects 618, where a data object may represent a data segment, a compression region (CR) of data segments, or a container of one or more CRs. Fingerprints are mapped to a particular data object via metadata 616, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 601 includes file service interface 602, segmenter 604, duplicate eliminator 606, file system control 608, and storage unit interface 612. Deduplication storage engine 601 receives a file or files (or data item(s)) via file service interface 602, which may be part of a file system namespace 620 of a file system associated with the deduplication storage engine 601. The file system namespace 620 refers to the way files are identified and organized in the system. An example is to organize the files hierarchically into directories or folders, which may be managed by directory manager 622. File service interface 602 supports a variety of protocols, including a network file system (NFS), a common Internet file system (CIFS), and a virtual tape library interface (VTL), etc.

The file(s) is/are processed by segmenter 604 and file system control 608. Segmenter 604, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 608, also referred to as a file system manager, processes information to indicate the segment(s) association with a file. In some embodiments, a list of fingerprints is used to indicate segment(s) associated with a file. File system control 608 passes segment association information (e.g., representative data such as a fingerprint) to index 624. Index 624 is used to locate stored segments in storage units 610 via storage unit interface 612. Duplicate eliminator 606, also referred to as a segment store, identifies whether a newly received segment has already been stored in storage units 610. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 610 that make up the file. Segments are then packed by a container manager (which may be implemented as part of storage unit interface 612) into one or more storage containers stored in storage units 610. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 602 is configured to communicate with file system control 608 to identify appropriate segments stored in storage units 610 via storage unit interface 612. Storage unit interface 612 may be implemented as part of a container manager. File system control 608 communicates (e.g., via segmenter 604) with index 624 to locate appropriate segments stored in storage units via storage unit interface 612. Appropriate segments are retrieved from the associated containers via the container manager and are used to construct the requested file. The file is provided via interface 602 in response to the request. In one embodiment, file system control 608 utilizes a tree (e.g., a segment tree obtained from namespace 620) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 601 may be implemented in software, hardware, or a combination thereof. For example, deduplication engine 601 may be implemented in a form of executable instructions that can be stored in a machine-readable storage medium, where the instructions can be executed in a memory by a processor.

In one embodiment, storage system 600 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A computer-implemented method for data migration from a first storage system to a second storage system, the method comprising:
    maintaining a database containing deduplication information associated with a plurality of remote target storage systems, wherein the database is usable in determining through test deduplication a predicted deduplication ratio for any given dataset at each of the plurality of remote target storage systems, and wherein the deduplication information in the database is updated in response to migration of data to the plurality of remote target storage systems;
    identifying a plurality of storage devices of the first storage system as candidates to be migrated to the second storage system based on access patterns of the storage devices at the first storage system, including identifying one or more candidate storage devices that have input and output (IO) usages greater than a predetermined threshold over a predetermined period of time;
    for each of the candidate storage devices, performing a deduplication on data stored at the candidate storage device using the deduplication information of the database to determine a predicted deduplication ratio of the data for each of the plurality of remote target storage systems if the data was to be migrated to each of the plurality of remote target storage systems;
    selecting one or more storage devices from the identified candidates to be migrated to one of the plurality of remote target storage systems as the second storage system that has a highest predicted deduplication ratio amongst the identified candidates; and
    migrating one or more datasets stored at the selected one or more storage devices to the second storage system.

2. The method of claim 1, wherein maintaining the database comprises:
    selecting a first dataset that is stored at the first storage system;
    generating deduplication information of the first dataset;
    storing the generated deduplication information in the database; and
    migrating the first dataset to the second storage system.

3. The method of claim 2, wherein deduplication information includes fingerprints of data segments of the first dataset.

4. The method of claim 1, wherein identifying the plurality of storage devices of the first storage system as candidates comprises:
    for each storage device at the first storage system, determining an input/output (I/O) usage profile; and
    selecting the plurality of storage devices with an I/O usage profile that satisfies a predetermined category.

5. The method of claim 1, wherein a number of storage devices selected from the identified candidates is user configurable.

6. The method of claim 1, further comprising updating the database to include deduplication information of the migrated one or more datasets.

7. A non-transitory computer-readable medium having computer instructions stored therein, which when executed by a processor, cause the processor to perform operations comprising:
    maintaining a database containing deduplication information associated with a plurality of remote target storage systems, wherein the database is usable in determining through test deduplication a predicted deduplication ratio for any given dataset at each of the plurality of remote target storage systems, and wherein the deduplication information in the database is updated in response to migration of data to the plurality remote target storage systems;
    identifying a plurality of storage devices of the first storage system as candidates to be migrated to the second storage system based on access patterns of the storage devices at the first storage system, including identifying one or more candidate storage devices that have input and output (IO) usages greater than a predetermined threshold over a predetermined period of time;
    for each of the candidate storage devices, performing a deduplication on data stored at the candidate storage device using the deduplication information of the database to determine a predicted deduplication ratio of the data at each of the plurality of remote target storage system if the data was to be migrated to each of the plurality of remote target storage systems;

selecting one or more storage devices from the identified candidates to be migrated to one of the plurality of remote target storage systems as the second storage system that has a highest predicted deduplication ratio amongst the identified candidates; and migrating one or more datasets stored at the selected one or more storage devices to the second storage system.

8. The non-transitory computer-readable medium of claim 7, wherein maintaining the database comprises:

selecting a first dataset that is stored at the first storage system;

generating deduplication information of the first dataset;

storing the generated deduplication information in the database; and migrating the first dataset to the second storage system.

9. The non-transitory computer-readable medium of claim 8, wherein deduplication information includes fingerprints of data segments of the first dataset.

10. The non-transitory computer-readable medium of claim 7, wherein identifying the plurality of storage devices of the first storage system as candidates comprises:

for each storage device at the first storage system, determining an input/output (I/O) usage profile; and selecting the plurality of storage devices with an I/O usage profile that satisfies a predetermined category.

11. The non-transitory computer-readable medium of claim 7, wherein a number of storage devices selected from the identified candidates is user configurable.

12. The non-transitory computer-readable medium of claim 7, further comprising updating the database to include deduplication information of the migrated one or more datasets.

13. A data processing system, comprising:

a set of one or more processors; and a set of one or more memories to store instructions, which when executed from the set of one or more memories, cause the set of one or more processors to maintain a database containing deduplication information associated with a plurality of remote target storage systems, wherein the database is usable in determining through test deduplication a predicted deduplication ratio for any given dataset at each of the plurality of remote target storage systems, and wherein the deduplication information in the database is updated in response to migration of data to the plurality remote target storage systems;

identify a plurality of storage devices of the first storage system as candidates to be migrated to the second storage system based on access patterns of the storage devices at the first storage system, including identifying one or more candidate storage devices that have input and output (IO) usages greater than a predetermined threshold over a predetermined period of time, for each of the candidate storage devices, perform a deduplication on data stored at the candidate storage device using the deduplication information of the database to determine a predicted deduplication ratio of the data for each of the plurality of remote target storage systems if the data was to be migrated to each of the plurality of remote target storage systems;

select one or more storage devices from the identified candidates to be migrated to one of the plurality of remote target storage systems as the second storage system that has a highest predicted deduplication ratio amongst the identified candidates, and migrate one or more datasets stored at the selected one or more storage devices to the second storage system.

14. The data processing system of claim 13, wherein maintaining the database comprises:

selecting a first dataset that is stored at the first storage system;

generating deduplication information of the first dataset;

storing the generated deduplication information in the database; and migrating the first dataset to the second storage system.

15. The data processing system of claim 14, wherein deduplication information includes fingerprints of data segments of the first dataset.

16. The data processing system of claim 13, wherein identifying the plurality of storage devices of the first storage system as candidates comprises:

for each storage device at the first storage system, determining an input/output (I/O) usage profile; and selecting the plurality of storage devices with an I/O usage profile that satisfies a predetermined category.

17. The data processing system of claim 13, wherein a number of storage devices selected from the identified candidates is user configurable.

18. The data processing system of claim 13, further comprising updating the database to include deduplication information of the migrated one or more datasets.

* * * * *